(12) United States Patent
Ojala et al.

(10) Patent No.: US 8,532,017 B2
(45) Date of Patent: Sep. 10, 2013

(54) TPC COMMAND SIGNALING IN DL CONTROL CHANNEL IDENTIFYING THE TARGET AND LIMITING BLIND DECODING

(75) Inventors: Jussi Kustaa Ojala, Helsinki (FI); Frank Frederiksen, Klarup (DK); Lars Erik Lindh, Helsinki (FI); Jaakko Eero Samuli Visuri, Helsinki (FI)

(73) Assignee: Nokia Corporation, Espoo (FI)

( * ) Notice: Subject to any disclaimer, the term of this patent is extended or adjusted under 35 U.S.C. 154(b) by 285 days.

(21) Appl. No.: 12/679,854

(22) PCT Filed: Sep. 23, 2008

(86) PCT No.: PCT/IB2008/002488
§ 371 (c)(1),
(2), (4) Date: May 11, 2010

(87) PCT Pub. No.: WO2009/040636
PCT Pub. Date: Apr. 2, 2009

(65) Prior Publication Data
US 2010/0260117 A1 Oct. 14, 2010

Related U.S. Application Data

(60) Provisional application No. 60/960,293, filed on Sep. 24, 2007.

(51) Int. Cl.
*H04B 7/185* (2006.01)
(52) U.S. Cl.
USPC .............................. 370/318; 370/329; 455/522

(58) Field of Classification Search
None
See application file for complete search history.

(56) References Cited

U.S. PATENT DOCUMENTS

| 8,238,297 B2 * | 8/2012 | Papasakellariou et al. ... 370/329 |
| 2002/0141367 A1 * | 10/2002 | Hwang et al. ................. 370/335 |
| 2003/0185159 A1 * | 10/2003 | Seo et al. ...................... 370/278 |
| 2006/0154686 A1 * | 7/2006 | Sarkkinen et al. ............ 455/522 |
| 2008/0159323 A1 * | 7/2008 | Rinne et al. .................. 370/431 |
| 2009/0034465 A1 * | 2/2009 | Papasakellariou et al. ... 370/329 |

FOREIGN PATENT DOCUMENTS

| EP | 0993128 A | 4/2000 |
| WO | 02065667 A1 | 8/2002 |

OTHER PUBLICATIONS

International Search Report and Written Opinion of the International Searching Authority mailed Jun. 2, 2009, for corresponding PCT Application No. PCT/IB2008/002488 filed Sep. 23, 2008, 9 pages.

* cited by examiner

*Primary Examiner* — Ayaz Sheikh
*Assistant Examiner* — Mounir Moutaouakil
(74) *Attorney, Agent, or Firm* — Squire Sanders (US) LLP

(57) ABSTRACT

The present invention provides a method for long term evolution in 3GPP. More particularly, the transmission of transmission power control command signaling in a down link control channel to user equipment. The present invention also provides a method and apparatus for identifying a target user equipment for a transmission power control command. The transmission power control command for physical uplink control channel and for persistent physical uplink shared channel assignments is transmitted via a downlink control channel format 3.

17 Claims, 3 Drawing Sheets

Transmission of DL-CCH Format 3 to User Equipment

Transmission of DL-CCH Format 3 to User Equipment

- Aggregation Levels for Format 1
- PDCCH Locations for Format 1/Aggregation Level & Location of Format 3

Allocation of DL-CCH Format 3 in a PDDCH

Identifying a Target User Equipment for a Transmission Power Control Command

User Equipment

System for Identifying a
Target UE for a TPC Command

TPC COMMAND SIGNALING IN DL CONTROL CHANNEL IDENTIFYING THE TARGET AND LIMITING BLIND DECODING

RELATED APPLICATION

This application was originally filed as PCT Application No. PCT/IB2008/002488 filed Sep. 23, 2008, which claims priority to U.S. Application No. 60/960,293 filed Sep. 24, 2007.

CROSS REFERENCE TO RELATED APPLICATIONS:

This application claims priority of U.S. Provisional Patent Application No. 60/960,293, filed on Sep. 24, 2007. The subject matter of the earlier filed application is hereby incorporated by reference.

BACKGROUND OF THE INVENTION

1. Field of the Invention

The present invention generally relates to the Long Term Evolution (LTE) of the $3^{rd}$ Generation Partnership Project Protocol Release 8 (3GPP) and, in particular, to the transmission of transmission power control (TPC) command signaling in a down link control channel (DL-CCH), to user equipment (UE).

2. Description of the Related Art

In 3GPP, the evolved Universal Mobile Telecommunications System (UMTS) Terrestrial Radio Access Network (e-UTRAN) has been defined and is currently being used for the LTE system. UE operating in e-UTRAN or a LTE network may obtain communication services according to the current 3GPP standard. In this regard, for both networks, the 3GPP standard specifies radio system parameters, data transfer procedures, protocols, control messages and bearer traffic exchange over the air interface.

e-UTRAN architecture collectively includes at least one base transceiver station (e-NodeB), and at least one UE. The RAN architecture provides connectivity between the UE and a core network, transmitting many traffic types from real-time circuit switched to internet protocol-based packet switched communication.

In a currently adapted approach in 3GPP, a downlink grant via a Physical Downlink Control Channel (PDCCH) may include the TPC command signal for a Physical Uplink Control Channel (PUCCH), and an uplink grant via the PDCCH may include the TPC command signal for a Physical Uplink Shared Channel (PUSCH).

The TPC command signal may be included in three different DL-CCH file formats, e.g. format 0, format 1, and/or format 2, in the downlink grant via the PDCCH. The TPC command signal may be included in one DL-CCH file format, e.g. format 0, in the uplink grant via the PDCCH.

However, because scheduled downlink and/or uplink transmissions may occur infrequently, UE may not receive necessary TPC command signaling for controlling the transmission power of the PUCCH or the PUSCH.

SUMMARY OF THE INVENTION

In accordance with an embodiment of the present invention, there is provided a method including, setting a payload size of a downlink control channel format 3 to correspond to a payload size of another downlink control channel format. The downlink control channel format 3 may comprise a transmission power control command. The method may further include assigning an identifier to the transmission power control command for identifying the transmission power control command in the downlink control channel, allocating the downlink control channel format 3 to a location of the another downlink control channel, and transmitting the allocated downlink control channel format 3, including the transmission power control command, to a user equipment via the another downlink control channel.

In accordance with an embodiment of the present invention, there is also provided an apparatus, including a setting unit configured to set a payload size of a downlink control channel format 3 to correspond to a payload size of another downlink control channel format. The downlink control channel format 3 may comprise a transmission power control command. The apparatus further includes an assignor configured to assign an identifier to the transmission power control command to identify the transmission power control command in the downlink control channel, an allocator configured to allocate the downlink control channel format 3 to a location of the another downlink control channel, and a transmitter configured to transmit the allocated downlink control channel format 3, including the transmission power control command, to a user equipment via the another downlink control channel.

In accordance with another embodiment of the present invention, there is also provided a method, including assigning a six-bit header transmission power control element to each of the user equipment. The method may also include combining a transmission power control command and a known periodicity of transmission of transmission control power commands for creating a jointly coded transmission power control command, and identifying a target user equipment based upon the jointly coded transmission power control command using the six-bit header transmission control power element.

In accordance with an embodiment of the present invention, there is also provided an apparatus, including a six-bit header. The apparatus may further include a receiver configured to receive a transmission power control command and a known periodicity of transmission of transmission control power commands, and a decoder configured to combine the transmission power control command and the known periodicity of transmission of transmission control power commands to create a jointly coded transmission power control command.

In accordance with another embodiment of the present invention, there is further provided a computer program, embodied on a computer readable medium. The computer program is configured to control a processor to perform at least the methods outlined above.

DETAILED DESCRIPTION OF THE PREFERRED EMBODIMENT(S)

In general, various embodiments of the present invention relate to the LTE system according to the 3GPP standard and, in particular, to TPC command signaling via format 3 to UE in an e-UTRAN for a LTE system according to the 3GPP standard.

To signal a TPC command, the 3GPP standard has defined format 3 in 3GPP TS 36.212 v.1.4.2r1 as follows: DL-CCH format 3 is used for the transmission of TPC commands for PUCCH and for persistent PUSCH assignments. TPC commands for user 1, user 2 . . . user N may be transmitted by means of the DL-CCH format 3. The 3GPP standard has not defined a protocol for limiting blind decoding in UE.

The present invention may limit the blind decoding in UE by limiting the possible locations and size of DL-CCH format 3 in a PDCCH. The present invention also provides for TPC command signaling to UE that do not have scheduled downlink and/or uplink transmissions but need to receive the TPC command in order to control transmission power of the PUCCH or the PUSCH. The present invention also provides for identifying a target UE for a TPC command.

The periodicity of TPC commands is assumed to be signaled to UE or known from a specification. The present invention may limit the blind decoding in UE by limiting the possible locations and size of DL-CCH format 3 in a PDCCH.

Figure 1:
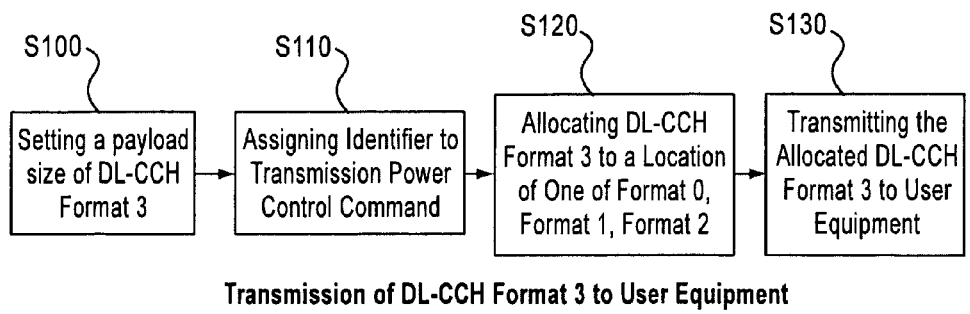
FIG. 1 illustrates a flow chart according to an embodiment of the present invention.

FIG. 1 illustrates a method according to an embodiment of the present invention. The method may include setting a payload size of a downlink control channel format 3 to correspond to a payload size of another downlink control channel format selected from one of format 0, format 1, and format 2 (S100). The downlink control channel format 3 may include a transmission power control command. Because the location where the transmission power control command may be carried is limited to where the format 3 may exist in the downlink control channel, the method may also include assigning an identifier to the transmission power control command for identifying the transmission power control command in the downlink control channel (S110). The identifier may include a header cyclic redundancy check.

The method also may include allocating the downlink control channel format 3 to a location of the another downlink control channel based on the payload size of the downlink control channel format 3 (S120). Allocating the downlink control channel format 3 to the location of the another downlink control channel includes allocating the downlink control channel format 3 across different aggregation levels of the another downlink control channel. The method may also include transmitting the allocated downlink control channel format 3, including the transmission power control command, to a user equipment via the another downlink control channel (S130).

The method of setting the payload size of the downlink control channel format 3 to correspond to the payload size of another downlink control channel format permits user equipment and a base transceiver station to have similar rate matching configurations for both format 3 and one of format 0, format 1, and format 2.

Furthermore, the method may prevent a terminal from blindly decoding the downlink control channel with different rate matching configurations to locate the downlink control channel format 3.

The identifier may enable separation of the downlink control channel format 3 from other PDDCH formats that may be located at the same position in the downlink control channel. Allocating the downlink control channel across different aggregation levels allows a control channel to have sufficient quality to receive the transmission power control signal.

The above described method provides for transmission of the transmission power control command by means of the DL-CCH format 3 allocated to a location of one of format 0, format 1, and format 2 to UE for controlling the transmission power of PUCCH or PUSCH.

Figure 2:
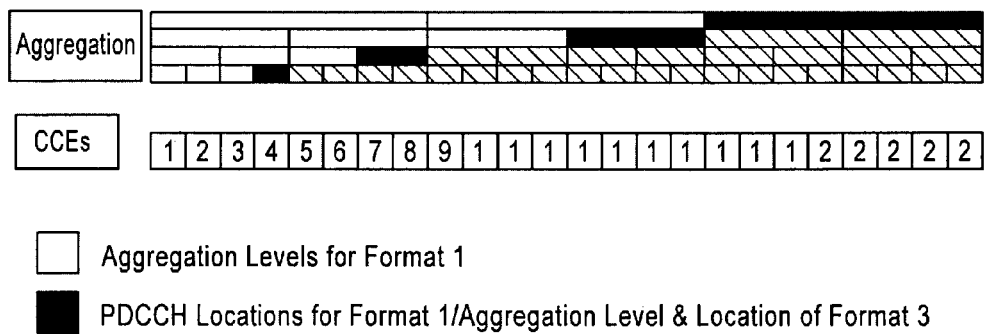
FIG. 2 illustrates an allocation of a DL-CCH format 3 in a PDCCH according to an embodiment of the present invention.

FIG. 2 further illustrates the method discussed above in FIG. 1 with respect to format 1. The white and black boxes represent possible aggregation levels and PDCCH locations for format 1. When DL-CCH format 3 includes the same payload size as format 1, a sub-set of possible PDCCH locations of format 1 are available for transmission of format 3 and the transmission power control signal associated therewith, as illustrated by the aggregation levels and locations in black shown in FIG. 2.

For example, as shown in FIG. 2, DL-CCH format 3 has the same payload size as one of format 0, format 1, and format 2. Either an uplink scheduling is granted for format 0 or a downlink scheduling is granted for format 1 because the downlink scheduling grant for format 2 and the downlink scheduling grant for format 0 may have limited possibilities of aggregation levels for the channel coefficient estimations (CCEs).

In this prior example, DL-CCH format 3 may have a fixed payload size per. Unused resources may be utilized for power boosting of used TPC commands or other PDDCH.

Hence, according to one example, the possible locations of DL-CCH format 3 should be a subset of possible locations of the format of the format that the DL-CCH format 3 follows. In one embodiment, the appropriate aggregation level is dependent on the cell size and the power boosting restrictions of format 0, format 1, or format 2.

Embodiments of the present invention also provide for identifying a target UE for a TPC command. As noted above, the periodicity of a UE receiving a TPC command is well-known; however, a method is needed to separate and identify an appropriate target UE for a DL-CCH format 3 including a TPC command signal.

Figure 3:
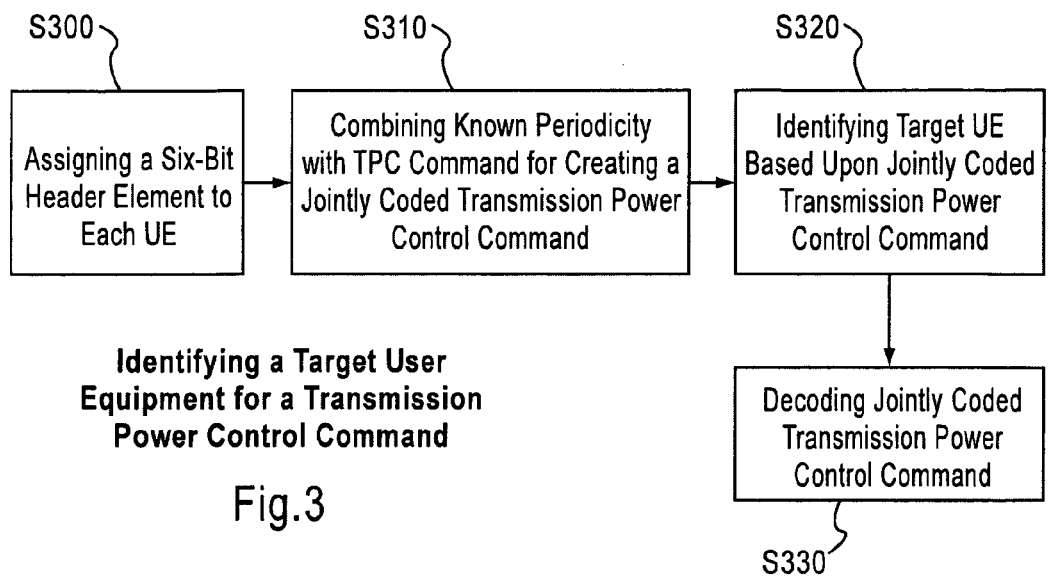
FIG. 3 illustrates a flow chart according to another embodiment of the present invention.

FIG. 3 illustrates a method according to an embodiment of the present invention. The method may include combining a header with a known periodicity of transmission control power commands for creating separation between user equipment.

The method may include assigning a six-bit header transmission power control element to each of the user equipment (S300). The six-bit header transmission power control element may include a four-bit header configured to identify the transmission control power command, a first one bit configured to indicate whether a transmission power control command is for a PUCCH or a PUSCH, and a second one bit configured to indicate whether an adjustment for the transmission power control command should be up or down. The method may also include combining a transmission power control command and a known periodicity of transmission of transmission control power commands for creating a jointly coded transmission power control command (S310). The method may also include identifying a target user equipment based upon the jointly coded transmission power control command using the six-bit header transmission control power element (S320).

Identifying the target user equipment based upon the jointly coded transmission power control command may further include determining whether the transmission power control command is for PUCCH or PUSCH by one of decoding the first one bit and decoding the known periodicity of the transmission control power commands (S330). For example, decoding a transmission time interval with an odd system frame number carrying information for PUCCH or a transmission time interval with an even system frame number carrying information for PUSCH transmission power control commands. The known periodicity may also be UE specific.

Figure 4:
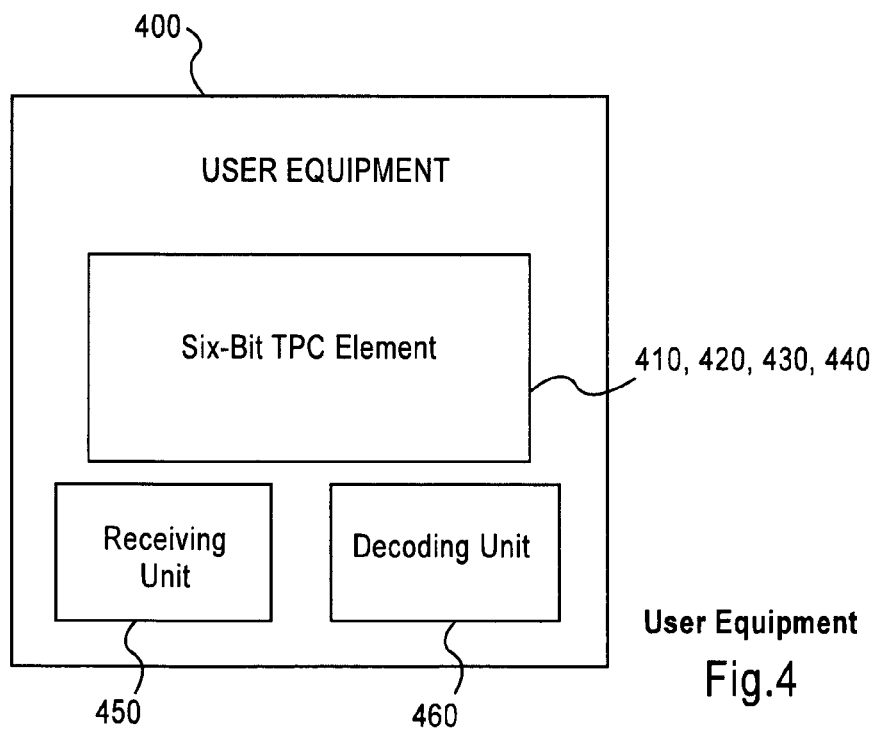
FIG. 4 illustrates a user equipment according to an embodiment of the present invention.

FIG. 4 illustrates UE according to an embodiment of the present invention. The UE 400 may include a six-bit header 410, the six-bit header 410 including a four-bit header 420 configured to identify the transmission control power command, a first one bit 430 configured to indicate whether a transmission power control command is for a PUCCH or a PUSCH, and a second one bit 440 configured to indicate whether an adjustment for the transmission power control command should be up or down. The UE 400 may further include a receiving unit 450 configured to receive a transmission power control command and a known periodicity of transmission of transmission control power commands. The UE may further include a decoding unit 460 configured to combine the transmission power control command and the known periodicity of transmission of transmission control power commands for creating a jointly coded transmission power control command. The decoding unit 460 may further be configured to decode the jointly coded transmission power control command for determining whether the UE 400 is a target UE for the jointly coded transmission power control command.

Figure 5:
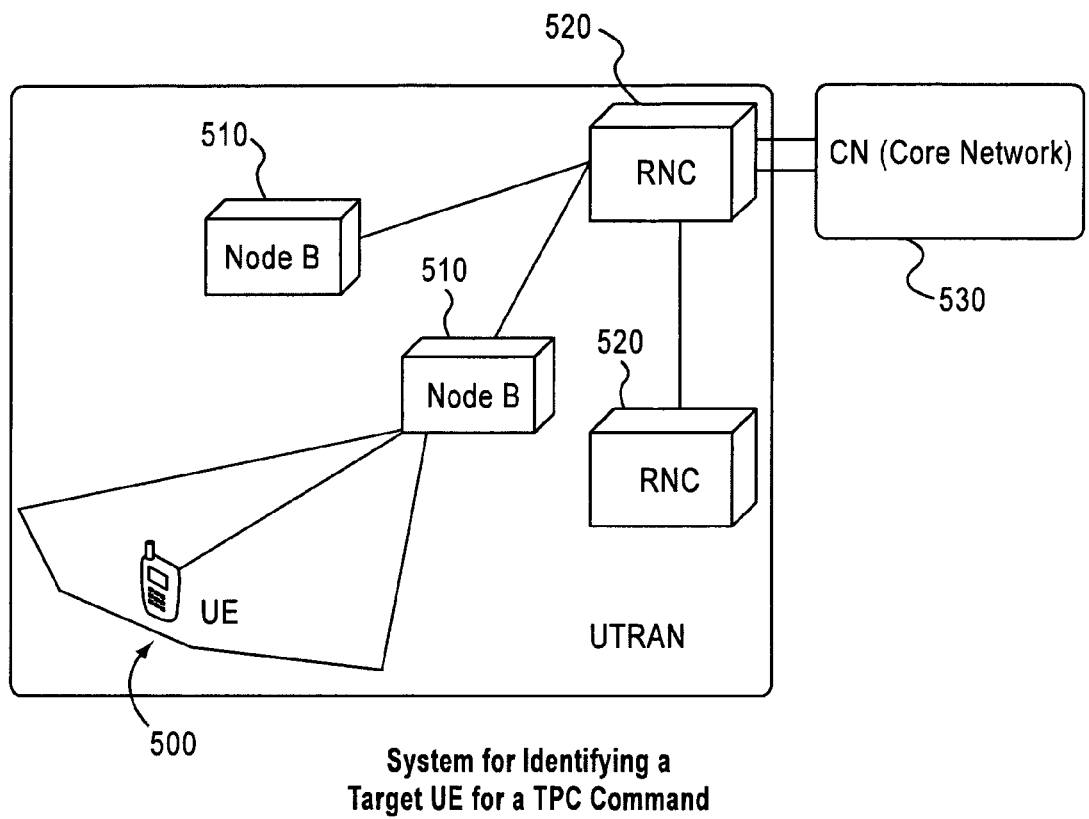
FIG. 5 illustrates a system according to an embodiment of the present invention.

FIG. 5 illustrates a system according to an embodiment of the present invention. The system may be an e-UTRAN system and may include at least one user equipment 500 as discussed above in FIG. 4. The system may also include at least one e-NodeB 510, at least one radio network controller 520, and a core network element 530.

The improvements provided by the various embodiments of the present invention may result in at least the following advantages: reduction in blind decoding required in the UE, and identification of a target UE for the TPC command signal for controlling the transmission power of PUCCH and PUSCH.

As used above, a UE may include, for example, a mobile telephone, a personal digital assistant, a personal computer, a communication-ready multimedia device, or the like.

The various apparatuses above may implement the features described above using hardware, software, or a hybrid of software and hardware. The various methods above may be implemented using hardware, software, or a hybrid of software and hardware. Thus, certain embodiments of the present invention may include a computer program product embodied on a computer-readable medium and encoding instructions configured (when executed on a device) to cause the device to perform one or more of the various methods discussed above. As an example, a computer readable medium may be at least partially embodied by a transmission line, a compact disk, digital-video disk, a magnetic tape, a Bernoulli drive, a magnetic disk, holographic disk or tape, a punch card, flash memory, magnetoresistive memory, integrated circuits, or other digital processing apparatus memory devices.

One having ordinary skill in the art will readily understand that the invention as discussed above may be practiced with steps in a different order, and/or with hardware elements in configurations which are different than those which are disclosed. The various embodiments discussed above, and the elements thereof, can be implanted separately or practiced in any combination. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A method comprising:
setting a payload size of a downlink control channel format, that addresses multiple users at the same time with independent messages, to correspond to a payload size of another downlink control channel format, wherein the downlink control channel format comprises a transmission power control command;
assigning an identifier to the transmission power control command for identifying a target user for the transmission power control command in the downlink control channel format;
allocating the downlink control channel format to a location of a downlink control channel, wherein locations available for allocating the downlink control channel format are a sub-set of possible locations available for allocating the another downlink control channel format, said allocating the downlink control channel format to the location of the downlink control channel comprises allocating the downlink control channel format across different aggregation levels of the downlink control channel, and at least one aggregation level is dependent on a cell size and a power boosting restriction of the another downlink control channel format; and
transmitting the allocated downlink control channel format, including the transmission power control command, to a user equipment via the downlink control channel.

2. The method according to claim 1, wherein the another downlink control channel format is selected from format 0, format 1, and format 2.

3. The method according to claim 1, wherein the identifier comprises a header element.

4. The method according to claim 1, wherein said allocating of the downlink control channel format to the location of the downlink control channel is based on the payload size of the downlink control channel format.

5. The method according to claim 1, wherein the downlink control channel format comprises a downlink control channel format 3.

6. The method according to claim 1, wherein the independent messages comprise control messages.

7. The method according to claim 6, wherein the control messages comprise transmit power control messages for different user equipment.

8. An apparatus comprising:
at least one processor; and
at least one memory including computer program code,
the at least one memory and the computer program code configured, with the at least one processor, to cause the apparatus at least to
set a payload size of a downlink control channel format, that addresses multiple users at the same time with independent messages, to correspond to a payload size of another downlink control channel format, wherein the downlink control channel format comprises a transmission power control command;
assign an identifier to the transmission power control command to identify a target user for the transmission power control command in the downlink control channel format;
allocate the downlink control channel format to a location of a downlink control channel, wherein locations available for allocating the downlink control channel format are a sub-set of possible locations available for allocating the another downlink control channel format, said allocating the downlink control channel format to the location of the downlink control channel comprises allocating the downlink control channel format across different aggregation levels of the downlink control channel, and at least one aggregation level is dependent on a cell size and a power boosting restriction of the another downlink control channel format; and transmit the allocated downlink control channel format, including the transmission power control command, to a user equipment via the downlink control channel.

9. The apparatus according to claim 8, wherein the another downlink control channel format is selected from format 0, format 1, and format 2.

10. The apparatus according to claim 8, wherein the identifier comprises a header element.

11. The apparatus according to claim 8, wherein said allocating of the downlink control channel format to the location of the downlink control channel is based on the payload size of the downlink control channel format.

12. The apparatus according to claim 8, wherein the downlink control channel format comprises a downlink control channel format 3.

13. The apparatus according to claim 8, wherein the independent messages comprise control messages.

14. The apparatus according to claim 13, wherein the control messages comprise transmit power control messages for different user equipment.

15. A non-transitory computer readable medium having a computer program stored thereon, the computer program configured to control a processor to perform a method comprising:

setting a payload size of a downlink control channel format, that addresses multiple users at the same time with independent messages, to correspond to a payload size of another downlink control channel format, wherein the downlink control channel format comprises a transmission power control command;

assigning an identifier to the transmission power control command for identifying a target user for the transmission power control command in the downlink control channel format;

allocating the downlink control channel format to a location of a downlink control channel, wherein locations available for allocating the downlink control channel format are a sub-set of possible locations available for allocating the another downlink control channel format, said allocating the downlink control channel format to the location of the downlink control channel comprises allocating the downlink control channel format across different aggregation levels of the downlink control channel, and at least one aggregation level is dependent on a cell size and a power boosting restriction of the another downlink control channel format; and transmitting the allocated downlink control channel format, including the transmission power control command, to a user equipment via the downlink control channel.

16. The non-transitory computer readable medium according to claim 15, wherein said allocating of the downlink control channel format to the location of the downlink control channel is based on the payload size of the downlink control channel format.

17. The non-transitory computer readable medium according to claim 15, wherein the downlink control channel format comprises a downlink control channel format 3.

* * * * *